Sept. 5, 1933.                P. P. STOKER                1,925,345
                  RAILWAY SWITCH CONTROLLING APPARATUS
                      Original Filed March 30, 1932
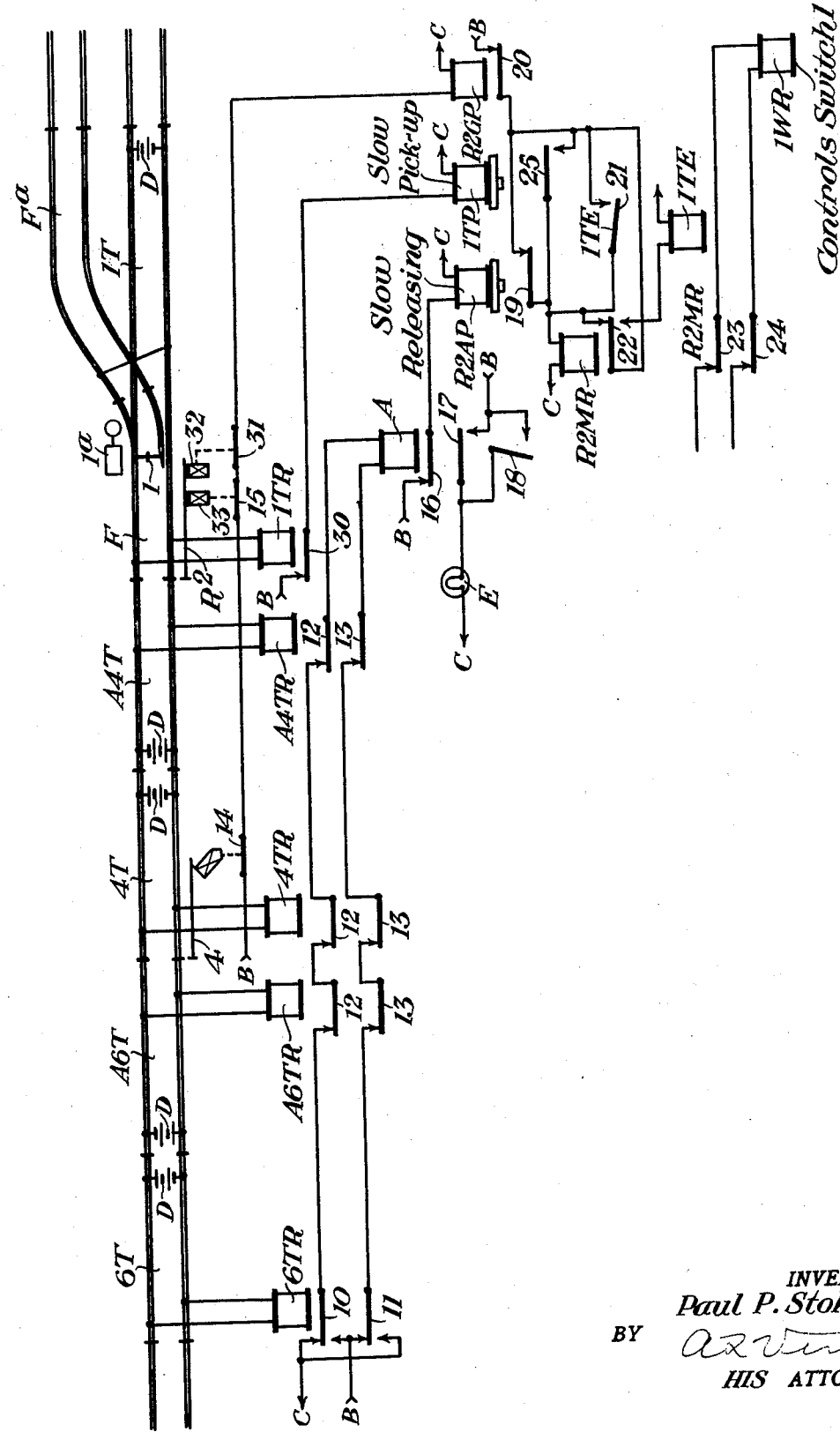
INVENTOR
Paul P. Stoker.
BY
HIS ATTORNEY Patented Sept. 5, 1933

1,925,345

UNITED STATES PATENT OFFICE 1,925,345

RAILWAY SWITCH CONTROLLING APPARATUS

Paul P. Stoker, Wilkinsburg, Pa., assignor to The Union Switch & Signal Company, Swissvale, Pa., a corporation of Pennsylvania Application March 30, 1932, Serial No. 601,981
Renewed September 14, 1932

8 Claims. (Cl. 246—41)

My invention relates to railway switch controlling apparatus, and has for an object the provision of novel and improved means for indicating the approach of a train to a switch and for locking the switch in response to the approach of such train.

I will describe one form of apparatus embodying my invention, and will then point out the novel features thereof in claims.

The accompanying drawing is a diagrammatic view showing one form of apparatus embodying my invention.

Referring to the drawing, the reference character F designates a stretch of railway track which is provided with a switch 1 leading into a branch track F$^a$. The track F is divided into track sections, such as 6T, A6T, etc., the section 1T being the section which includes the switch 1. Each track section is provided with a track circuit comprising a battery D and a track relay designated by the reference character TR with a suitable distinguishing prefix. Traffic over the switch 1 is governed by a signal R2 having a high speed arm 32 and a low speed arm 33, and the high speed arm is provided with the usual distant signal 4 located at the entrance end of track section 4T.

Located adjacent the switch 1 is a polarized approach locking relay A. This relay is provided with a circuit which passes from terminal B of a suitable source of current, through front contact 11 of track relay 6TR, front contact 13 of track relay A6TR, front contact 13 of track relay 4TR, front contact 13 of track relay A4TR, winding of relay A, front contact 12 of each relay A4TR, 4TR and A6TR, and front contact 10 of track relay 6TR to terminal C of the same source. When this circuit is closed relay A is supplied with current of normal polarity and polar contact 18 of this relay is then open. When track section 6T is occupied by a train, so that track relay 6TR is deenergized, the circuit for relay A will be the same as before, except that the relay will be supplied with current of reverse polarity due to the fact that contacts 10 and 11 of relay 6TR function as a pole-changer. Contact 18 will then be closed. When a train occupies any one of the sections A6T, 4T and A4T, so that the corresponding track relay is deenergized, the circuit for relay A will be open.

The switch 1 is provided with a switch operating mechanism 1$^a$, which will usually be controlled from a remote point, such as a despatcher's office or an interlocking tower. Located at such control point is a lamp E or other suitable indicating device, the purpose of which is to indicate when a train is approaching switch 1. This lamp is provided with a circuit which passes from terminal B, through polar contact 18 of relay A, and the lamp E to terminal C. The circuit for lamp E is provided with a branch around polar contact 18, which branch includes a back neutral contact 17 of relay A. It follows that when relay A is energized in the normal direction lamp E will be extinguished, but that this lamp will be lighted when relay A is energized in the reverse direction and also when relay A is deenergized.

A front neutral contact 16 of relay A controls a slow releasing relay R2AP, through a circuit which will be obvious from the drawing. Front contact 30 of track relay 1TR controls a slow pick-up relay 1TP by virtue of a circuit which will also be obvious from the drawing. Associated with these relays is a signal repeater relay R2GP; this relay is provided with a circuit which passes from terminal B through a contact 14 operated by distant signal 4, contact 15 operated by arm 33 of signal R2, contact 31 operated by arm 32 of signal R2, and the winding of relay R2GP to terminal C. Contact 14 is closed when signal 4 indicates stop or caution, whereas each contact 15 and 31 is closed when and only when the associated signal arm indicates stop.

An approach locking relay R2MR is provided with a pick-up circuit which passes from terminal B, through front contact 20 of relay R2GP, front contact 19 of relay R2AP, and the winding of relay R2MR to terminal C. Relay R2MR is provided with a stick circuit which includes contact 20 of relay R2GP and front contact 22 of R2MR. Relay R2MR controls the switch 1 in such manner that the switch cannot be operated unless this relay is energized. As here shown, the control of switch 1 is accomplished through a switch control relay 1WR, which is provided with a circuit including front contacts 23 and 24 of relay R2MR. This circuit will also be controlled by a suitable lever at the control point, as well as by other locking relays which are not essential to the disclosure of the present invention. The pick-up circuit for relay R2MR is provided with a branch around contact 19, which branch includes back contact 25 of relay 1TP. The pick-up circuit for relay R2MR is also provided with another branch around contact 19, which includes front contact 21 of a time element relay 1TE. This time element relay is provided with a circuit which passes from terminal B, through contact 20 of relay R2GP, back contact 22 of relay R2MR, and the winding of relay 1TE to terminal C.

The operation of the apparatus shown in the drawing is as follows: In the absence of trains, relay A is energized in the normal direction, so that lamp E is extinguished. Relay R2MR is energized by its normal circuit through contacts 19 and 20, so that the switch 1 may be controlled by the operator at the remote control point. When a train moving toward the right enters track section 6T, it will deenergize track relay 6TR, thereby causing current of reverse polarity to be supplied to relay A, so that lamp E will become lighted in response to the closing of contact 18. This will have no effect, however, on the apparatus for locking the switch 1. When the train enters track section A6T it will deenergize track relay A6TR, thereby opening the circuit for relay A, and this circuit will remain open until the rear end of the train leaves section A4T. While relay A is deenergized, lamp E will be lighted by virtue of its circuit through back contact 17. The opening of contact 16 of relay A will deenergize relay R2AP, thereby opening at contact 19 the pick-up circuit for relay R2MR.

Assuming now that one of the signals is at proceed so that relay R2GP is deenergized, with the result that relay R2MR is also deenergized, then the restoration of such signal to stop and the consequent closing of relay R2GP will not cause relay R2MR to close. While relay R2MR is deenergized, switch relay 1WR will be deenergized so that the switch cannot be moved.

Relays 1TP, R2GP and 1TE operate in the usual manner to permit the reenergization of relay R2MR after relay R2GP closes. The functions and operation of these relays form no part of my present invention, however, and a detailed explanation of their operation is unnecessary in the present case. These elements are shown only to illustrate the manner in which relay A is applied to a standard switch control system.

It will be seen from the foregoing that by means of a single relay A and a single pair of line wires for controlling it, I have provided for the approach indication of a train, as well as for the locking of the switch in response to the approach of the train.

Although I have herein shown and described only one form of apparatus embodying my invention, it is understood that various changes and modifications may be made therein within the scope of the appended claims without departing from the spirit and scope of my invention.

Having thus described my invention, what I claim is:

1. In combination, a stretch of railway track containing a switch and provided with at least two track sections successively occupied by a train approaching the switch, a track circuit including a track relay for each of said sections, a polar approach locking relay, means for supplying said polar relay with current of normal or reverse polarity according as the track relay for the section more remote from the switch is closed or open provided the other track relay is closed, and for deenergizing said polar relay when the said other track relay is open, means operating when said polar relay is deenergized and also when it is energized by current of reverse polarity but not when it is energized by current of normal polarity to indicate that one of said sections is occupied by a train, and locking means for said switch controlled by said polar relay and effective when the relay is deenergized but not when it is energized by current of either polarity.

2. In combination, a stretch of railway track containing a switch and provided with at least two track sections successively occupied by a train approaching the switch, a polar approach locking relay, means for supplying said polar relay with current of normal or reverse polarity according as the section more remote from the switch is unoccupied or occupied provided the other section is unoccupied and for deenergizing the polar relay when said other section is unoccupied, means operating when said polar relay is deenergized and also when it is energized by current of reverse polarity but not when it is energized by current of normal polarity to indicate that one of said sections is occupied by a train, and locking means for said switch controlled by said polar relay and effective when the relay is deenergized but not when it is energized by current of either polarity.

3. In combination, a stretch of railway track containing a switch and provided with at least two track sections successively occupied by a train approaching the switch, a track circuit including a track relay for each of said sections, a polar approach locking relay, means for supplying said polar relay with current of normal or reverse polarity according as the track relay for the section more remote from the switch is closed or open provided the other track relay is closed, and for deenergizing said polar relay when the said other track relay is open, an approach indicating device, a circuit for said device including a back neutral contact and a reverse polar contact of said relay connected in multiple, and locking means for said switch controlled by a front neutral contact of said relay.

4. In combination, a stretch of railway track containing a switch and provided with at least two track sections successively occupied by a train approaching the switch, a polar approach locking relay, means for supplying said polar relay with current of normal or reverse polarity according as the section more remote from the switch is unoccupied or occupied provided the other section is unoccupied and for deenergizing the polar relay when said other section is occupied, an approach indicating device controlled by said polar relay and effective when the relay is deenergized and also when it is energized in reverse direction but not when it is energized in normal direction, a slow releasing relay controlled by a front neutral contact of said polar relay, and locking means for said switch controlled by said slow releasing relay.

5. In combination, a stretch of railway track containing a switch and provided with at least two track sections successively occupied by a train approaching the switch, a track circuit including a track relay for each of said sections, a polar approach locking relay, means for supplying said polar relay with current of normal or reverse polarity according as the track relay for the section more remote from the switch is closed or open provided the other track relay is closed and for deenergizing said polar relay when the said other track relay is open, means operating when said polar relay is energized by current of reverse polarity but not when it is energized by current of normal polarity to indicate that one of said sections is occupied by a train, and locking means for said switch controlled by said polar relay and effective when the relay is deenergized but not when it is energized by current of either polarity.

6. In combination, a stretch of railway track containing a switch and provided with at least two track sections successively occupied by a train approaching the switch, a polar approach locking relay, means for supplying said polar relay with current of normal or reverse polarity according as the section more remote from the switch is unoccupied or occupied provided the other section is unoccupied and for deenergizing the polar relay when said other section is unoccupied, means operating when said polar relay is energized by current of reverse polarity but not when it is energized by current of normal polarity to indicate that one of said sections is occupied by a train, and locking means for said switch controlled by said polar relay and effective when the relay is deenergized but not when it is energized by current of either polarity.

7. In combination, a stretch of railway track containing a switch and provided with at least two track sections successively occupied by a train approaching the switch, a track circuit including a track relay for each of said sections, a polar approach locking relay, means for supplying said polar relay with current of normal or reverse polarity according as the track relay for the section more remote from the switch is closed or open provided the other track relay is closed and for deenergizing said polar relay when the said other track relay is open, an approach indicating device, a circuit for said device including a reverse polar contact of said relay, and locking means for said switch controlled by a front neutral contact of said relay.

8. In combination, a stretch of railway track containing a switch and provided with at least two track sections successively occupied by a train approaching the switch, a polar approach locking relay, means for supplying said polar relay with current of normal or reverse polarity according as the section more remote from the switch is unoccupied or occupied provided the other section is unoccupied and for deenergizing the polar relay when said other section is occupied, an approach indicating device controlled by said polar relay and effective when the relay is energized in reverse direction but not when it is energized in normal direction, a slow releasing relay controlled by a front neutral contact of said polar relay, and locking means for said switch controlled by said slow releasing relay.

PAUL P. STOKER.